(12) United States Patent
Carr

(10) Patent No.: US 8,177,247 B1
(45) Date of Patent: May 15, 2012

(54) PULLOUT STEP FOR VEHICLES

(76) Inventor: Jeffery Carr, Murrieta, CA (US)

( * ) Notice: Subject to any disclaimer, the term of this patent is extended or adjusted under 35 U.S.C. 154(b) by 238 days.

(21) Appl. No.: 12/660,864

(22) Filed: Mar. 6, 2010

(51) Int. Cl.
B60R 3/00 (2006.01)
(52) U.S. Cl. ........................ 280/166; 280/163
(58) Field of Classification Search .................. 280/163, 280/166; 296/75; 224/520
See application file for complete search history.

(56) References Cited

U.S. PATENT DOCUMENTS

| 1,953,298 | A | | 4/1934 | Goodwin | 182/91 |
|---|---|---|---|---|---|
| 2,158,949 | A | * | 5/1939 | Sarles et al. | 182/91 |
| 2,218,060 | A | | 10/1940 | Watson | 280/165 |
| 2,492,068 | A | * | 12/1949 | Schofield et al. | 280/166 |
| 2,670,968 | A | * | 3/1954 | Duffy | 182/89 |
| 3,229,993 | A | | 1/1966 | Riddle | 280/166 |
| 3,627,350 | A | | 12/1971 | Cross | 182/91 |
| 3,671,058 | A | * | 6/1972 | Kent | 280/166 |
| 3,758,134 | A | | 9/1973 | Stewart | |
| 3,887,217 | A | | 6/1975 | Thomas | |
| 3,980,319 | A | | 9/1976 | Kirkpatrick | 280/166 |
| 4,017,093 | A | | 4/1977 | Stecker, Sr. | |
| 4,185,849 | A | | 1/1980 | Jaeger | 280/166 |
| 4,194,754 | A | | 3/1980 | Hightower | 280/166 |
| 4,274,648 | A | | 6/1981 | Robins | 280/166 |
| 4,400,127 | A | | 8/1983 | Metz | 414/401 |
| 4,462,486 | A | | 7/1984 | Dignan | 182/91 |
| 4,557,494 | A | | 12/1985 | Elwell | 24/514 |
| 4,744,590 | A | * | 5/1988 | Chesney | 280/769 |
| 4,750,753 | A | | 6/1988 | Dezern | 280/164.1 |
| 4,800,471 | A | | 1/1989 | Lippert | 362/485 |
| 4,906,015 | A | | 3/1990 | LaCrois et al. | 224/519 |
| 4,953,065 | A | | 8/1990 | Kao | 362/307 |
| D316,394 | S | | 4/1991 | Carr | D12/203 |
| 5,038,983 | A | | 8/1991 | Tomososki | 224/521 |
| D324,019 | S | | 2/1992 | Bailey | D12/203 |
| 5,195,609 | A | * | 3/1993 | Ham et al. | 182/90 |
| RE34,275 | E | * | 6/1993 | Ramsey | 362/495 |
| 5,342,073 | A | | 8/1994 | Poole | 280/166 |
| 5,478,124 | A | | 12/1995 | Warrington et al. | 280/416 |
| D370,452 | S | | 6/1996 | Beasley | D12/203 |
| 5,538,269 | A | * | 7/1996 | McDaniel et al. | 280/166 |
| 5,690,260 | A | | 11/1997 | Aikins et al. | 224/504 |
| 5,738,362 | A | | 4/1998 | Ludwick | 280/166 |
| 5,803,475 | A | | 9/1998 | Dick | 280/163 |
| D409,557 | S | | 5/1999 | Armour | D12/408 |
| 5,979,094 | A | | 11/1999 | Bfrafford, Jr. et al. | 40/590 |
| 6,095,387 | A | | 8/2000 | Lipscomb | 224/485 |
| 6,170,842 | B1 | | 1/2001 | Mueller | 280/163 |
| 6,357,773 | B1 | | 3/2002 | Greer et al. | 280/166 |
| 6,471,002 | B1 | | 10/2002 | Weinerman | 182/91 |
| 6,511,086 | B2 | | 1/2003 | Schlicht | 280/166 |
| 6,533,303 | B1 | * | 3/2003 | Watson | 280/166 |
| 6,655,706 | B1 | | 12/2003 | Murrell | 280/166 |
| D491,509 | S | | 6/2004 | Bundy | |

(Continued)

FOREIGN PATENT DOCUMENTS

FR 2264688 10/1975

Primary Examiner — J. Allen Shriver, II
Assistant Examiner — James M Dolak
(74) Attorney, Agent, or Firm — Don Finkelstein

(57) ABSTRACT

A movable pullout step attachable to a vehicle and which has a spring actuated latching mechanism that selectively allows and restrains positioning of the pullout step in either a retracted position under the vehicle or a step position wherein a tread extends away from the vehicle to allow a person to stand thereon to facilitate the access to desired portions of the vehicle.

16 Claims, 10 Drawing Sheets

U.S. PATENT DOCUMENTS

| | | | |
|---|---|---|---|
| 6,880,843 B1 | 4/2005 | Greer | 280/166 |
| 6,986,523 B1 | 1/2006 | Bickford | |
| 7,111,859 B2 * | 9/2006 | Kim | 280/166 |
| 7,185,904 B1 | 3/2007 | Jones et al. | |
| 7,469,916 B2 | 12/2008 | Watson | 280/166 |
| 7,494,144 B1 | 2/2009 | Carr | 280/166 |
| D602,416 S | 10/2009 | Corwin | |
| 7,926,827 B2 * | 4/2011 | Kircher | 280/166 |
| 2004/0160034 A1 | 8/2004 | Mitchell | |
| 2005/0146112 A1 | 7/2005 | Bang et al. | |
| 2006/0049650 A1 | 3/2006 | Evans | |
| 2007/0267842 A1 | 11/2007 | Selbert et al. | 280/166 |

* cited by examiner

PULLOUT STEP FOR VEHICLES

BACKGROUND OF THE INVENTION

1. Field of the Invention

This invention relates to the auxiliary vehicle step art and more particularly to a step arrangement that may be bolted to the underside of a vehicle and which arrangement has a pull out step therein movable from a first, retracted position to a second, step position

2. Description of the Prior Art

In many vehicle applications it is desirable to proved a step on the vehicle to allow a person to step thereon in order to facilitate reaching various portions of the vehicle. There have hereto fore been proposed various step arrangements that may be mounted on a vehicle to provide the convenient access to the desired portion of the vehicle. Some of these prior movable step arrangements have provided a step that may be connected to the vehicle and may be positionable under the vehicle, if desired, while the vehicle is being driven and extendable from the vehicle when it is desired to use the step. Many of these movable step arrangements have incorporated complex mechanical systems that increased the cost thereof and/or have required extensive modifications to the vehicles in order to install them. Other step devices have shown systems that, in practice, have not proven to be reliable over long periods of time thereby often resulting in frequent repair or replacement. Still other of such movable steps have not been rugged enough to withstand the heavy use thereof often required in many applications.

Accordingly, it has long been desired to provide a rugged movable step that is conveniently attachable to a vehicle and is comparatively inexpensive to fabricate and is free of complex mechanical components.

SUMMARY OF THE INVENTION

The above and other objects of the present invention are achieved, in a preferred embodiment of a pull out step by providing a frame that is attachable to the underside of a vehicle such as a pickup truck or other vehicle. Such vehicles often require access to either the storage bed of the truck, the roof of the truck or other portions and the access thereto is facilitated by having a step upon which a person may stand to reach the desired portions. However, the pullout step is preferably positioned and retained under the vehicle when not in use and movable outwardly with respect to the vehicle when it is desired to utilize the step.

The frame has a tread member that is connected to a pair of rails which are operatively mounted on the frame and is movable in reciprocal directions with respect to the frame and to the vehicle such that in a retracted position of the tread, the tread is retained under the vehicle and in a step position the tread is extended outwardly from the vehicle.

A latching mechanism is provided to retain the tread in both the retracted and the step positions of the tread. The latching mechanism has a lever pivotally mounted on the frame for limited rotary movement thereon. The lever has a latch member thereon that is selectively positionable in a first, or engagement position wherein the latch member projects into an aperture in a first of the pair of rails and movable therefrom to a second, or retracted position wherein the latch member is free of engagement with the first rail. The latch member is spring biased into the first position. The first rail has a pair of apertures therein so that one of the apertures is positionable for engagement with the latch member for the tread in the retracted position and the second of the pair of apertures in the first rail is positionable for engagement with the latch member in the step position.

A flexible cable is connected to the lever for selectively moving the lever against the spring tension to move the latch member from the first position to the second and the spring biases the latch member from the second or retracted position to the first or engaged position. The cable has a knob on one end and the second end of the cable is connected to the lever. Manually pulling on the knob moves the latch member from the first position to the second position. With the latch member in the second, or retracted position, the tread may be manually moved between the retracted and step positions. When the tread is in the desired retracted or step position thereof, the knob may be released and the latch member is thus allowed to move under the spring force into the first or engagement position thereof to project into one of the apertures in the rail.

BRIEF DESCRIPTION OF THE DRAWING

The above and other embodiments of the present invention my be more fully understood from the following detailed description taken together with the accompanying drawing wherein similar reference characters refer to similar elements throughout and in which:

FIG. 11B is a view along the line 11B-11B of FIG. 11A; and.

DESCRIPTION OF THE PREFERRED EMBODIMENTS

Figure 1:
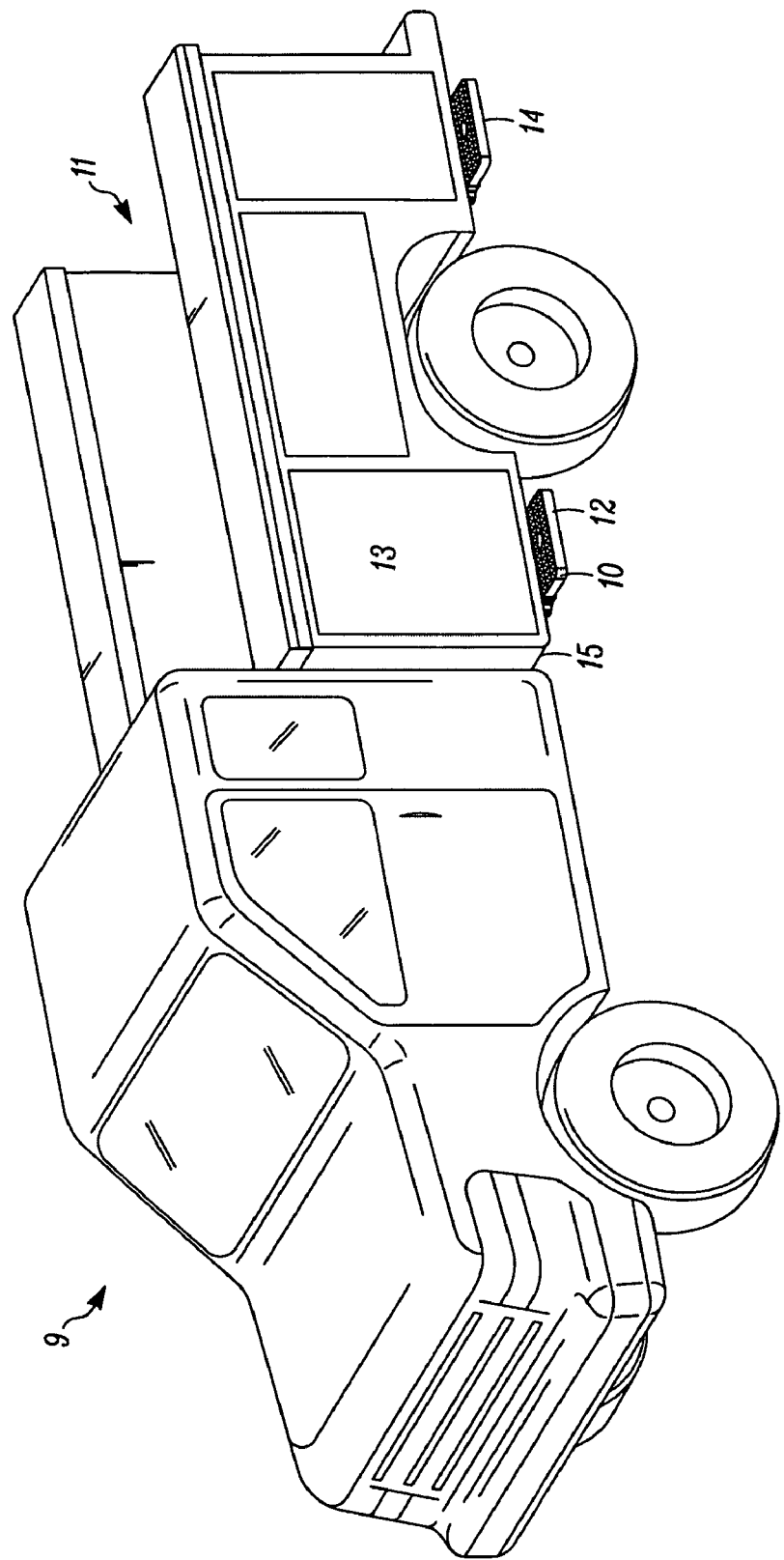
FIG. 1 is a perspective view of a vehicle showing two of the pullout steps of the present invention installed thereon and the steps in the step position thereof.

Referring now to the drawing, there is shown on FIG. 1 a perspective view of a vehicle 9 of the type having a storage bed 11. Access to the storage bed 11 from the sides of the vehicle such as side 13 is often hindered in such vehicles by the height of the side above the ground level. In order to provide convenient access to the bed 11, pullout steps of a preferred embodiment 10 of the present invention as indicated at 12 and 14 are installed on the underside 15 of the vehicle 9. While two installations are shown on FIG. 1, many vehicles are of a size such that only one pullout step may be required. The pullout step of the present invention may be installed on one side of the vehicle 9 or on both sides of the vehicle as desired for particular applications, or installed on one or more than one location as may be required or desired in other applications.

Figure 2:
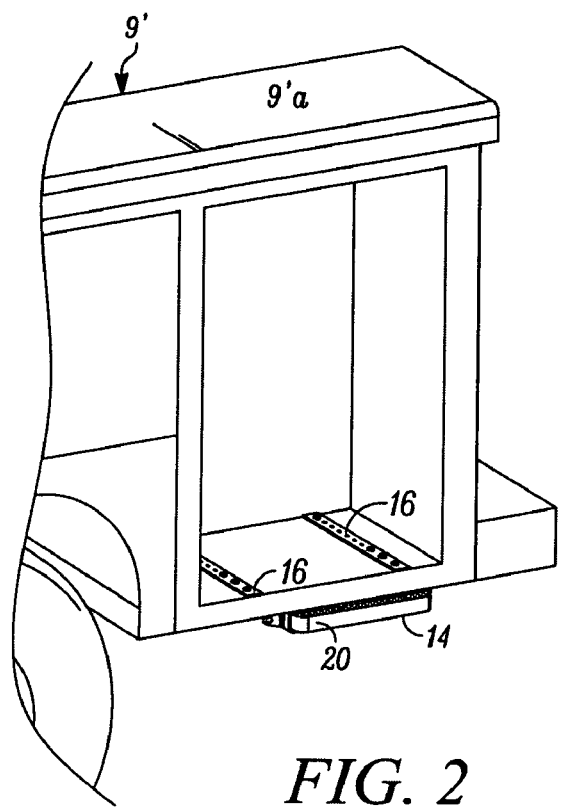
FIG. 2 is a partial perspective view of a vehicle similar to the vehicle of FIG. 1 showing a pullout step in the retracted position.
Figure 3:
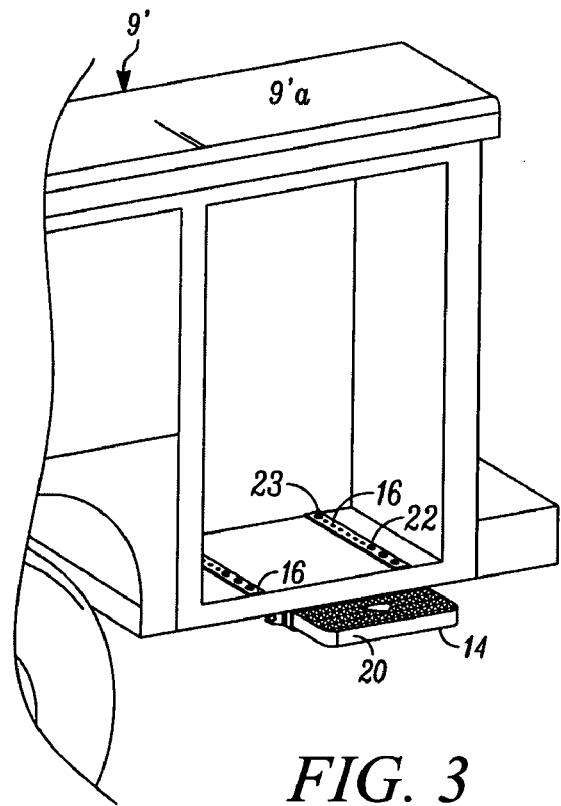
FIG. 3 is a partial perspective view of the vehicle of FIG. 2 showing the pullout step in the step position thereof.

FIG. 2 illustrates a vehicle 9' in which the pullout step 14 is installed to allow access to the roof 9'a of the vehicle 9'. In FIG. 2 the pullout step 14 is shown in the retracted position and for the installation in a vehicle such as vehicle 9', a pair of support straps 16 may be installed to provide additional support for the pullout step 14. FIG. 3 shows the pullout step 14 as installed on the vehicle 9' in the step position thereof. As shown there is a tread 20 that is reciprocatingly movable between the retracted position shown in FIG. 2 and the step position as shown in FIG. 3.

Figure 3A:
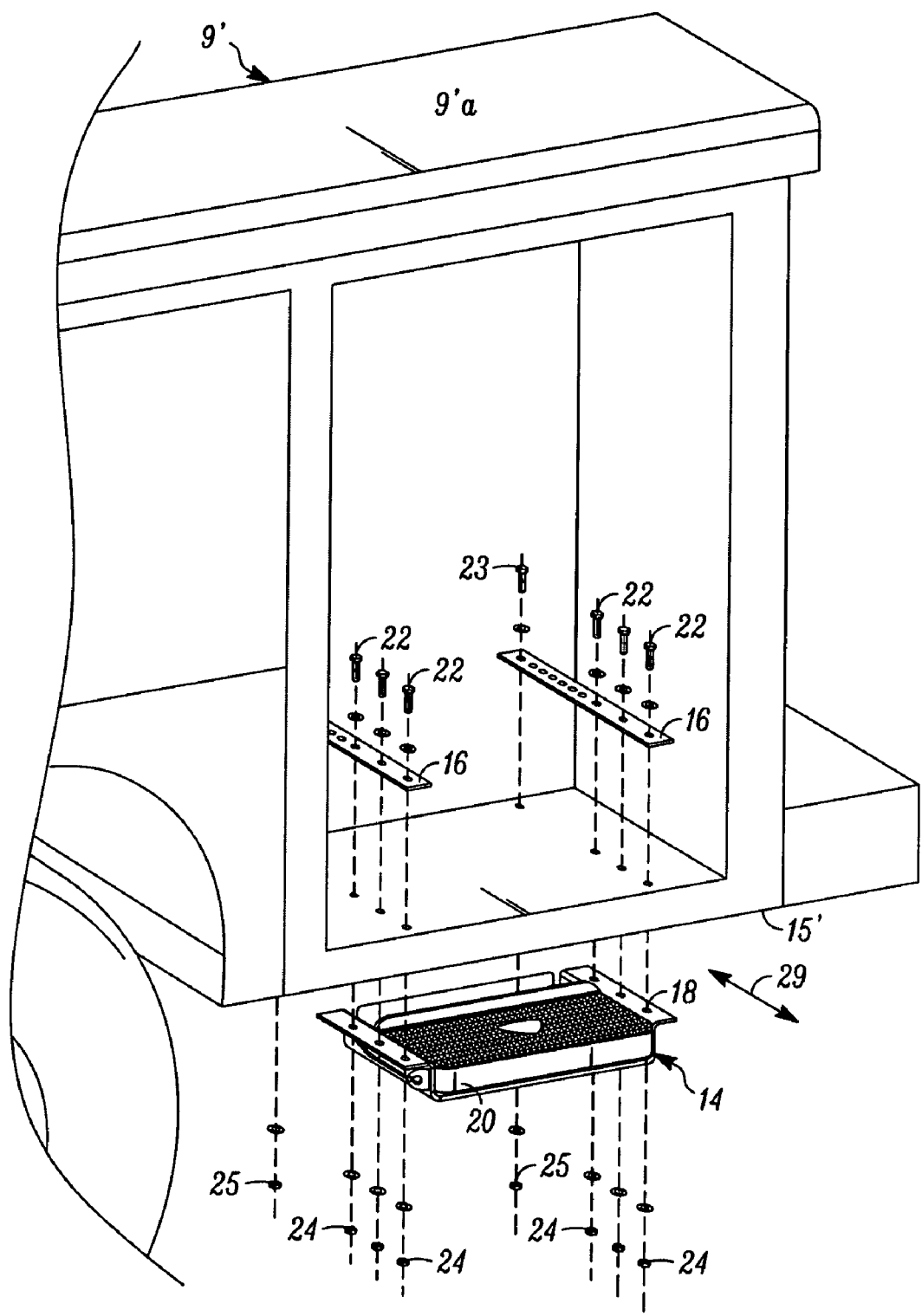
FIG. 3A is a partial perspective view similar to FIG. 2 showing an exploded view of the pullout step of the present invention as installed on a vehicle.

FIG. 3A shows the pullout step 14 as installed in the vehicle 9' in an exploded perspective view of the pullout step 14. As shown thereon, the tread 20 is mounted on a frame 18 which is bolted by bolts 22 and nuts and washers 24 to an underside 15' of the truck 9' which also connect the support straps 16 for the additional support as may be required in some applications. There may also be provided bolts 23 and nuts and washers 25 for additional support extending through the support straps 16. The tread 20 is reciprocatingly movable in the directions of the double ended arrow 29 with respect to the frame 18, as well as the vehicle 9', on which the tread 20 is mounted.

Figure 4:
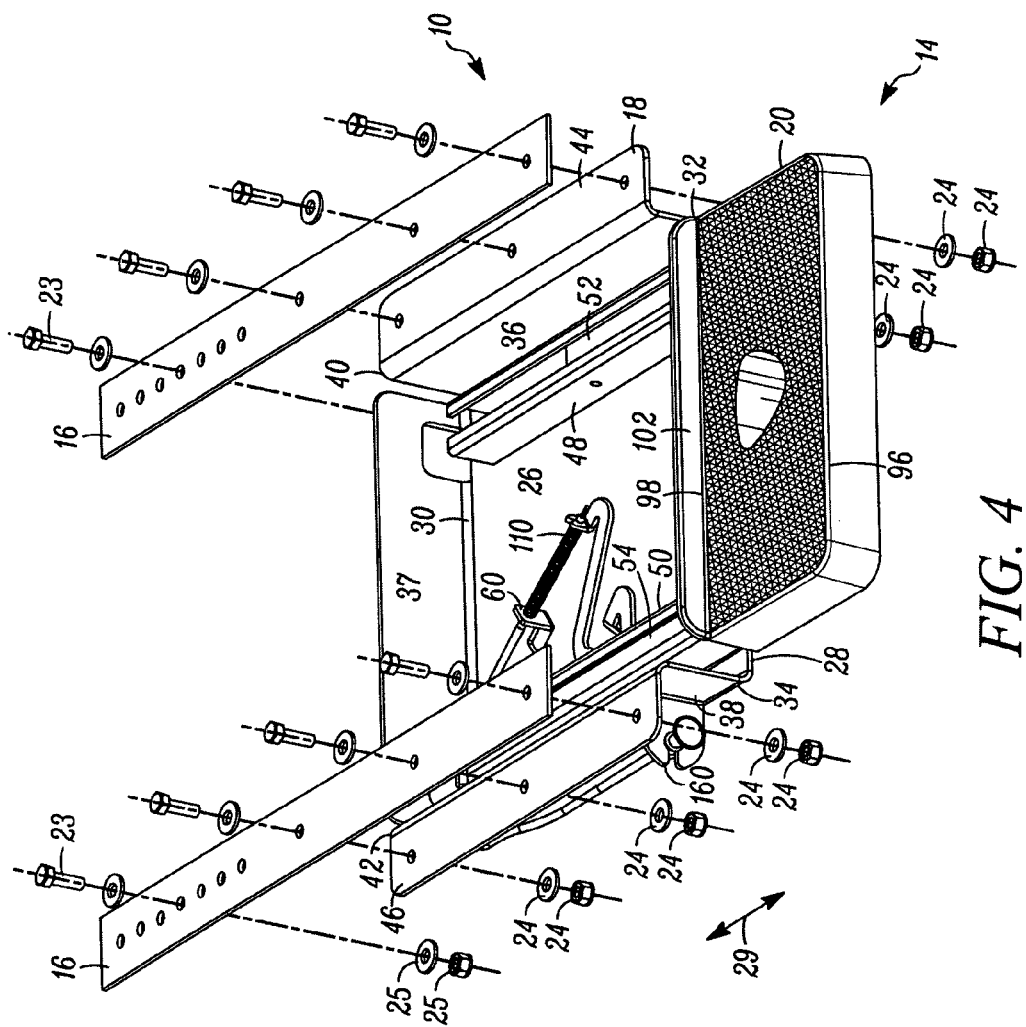
FIG. 4 is an exploded view of a preferred embodiment of the present invention.
Figure 4A:
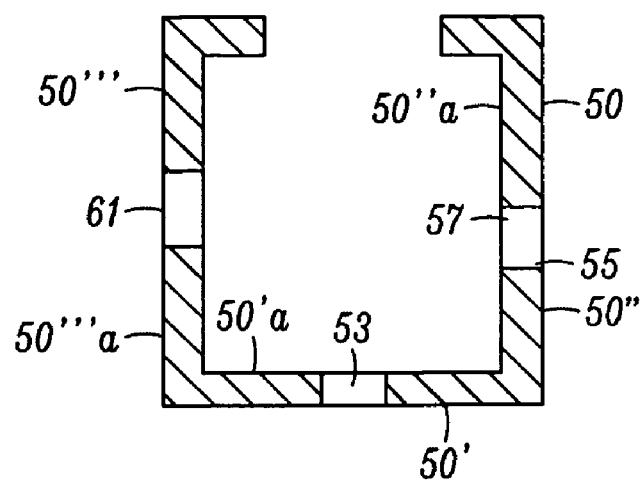
FIG. 4A is a sectional view of a guide useful in the practice of the present invention.
Figure 4B:
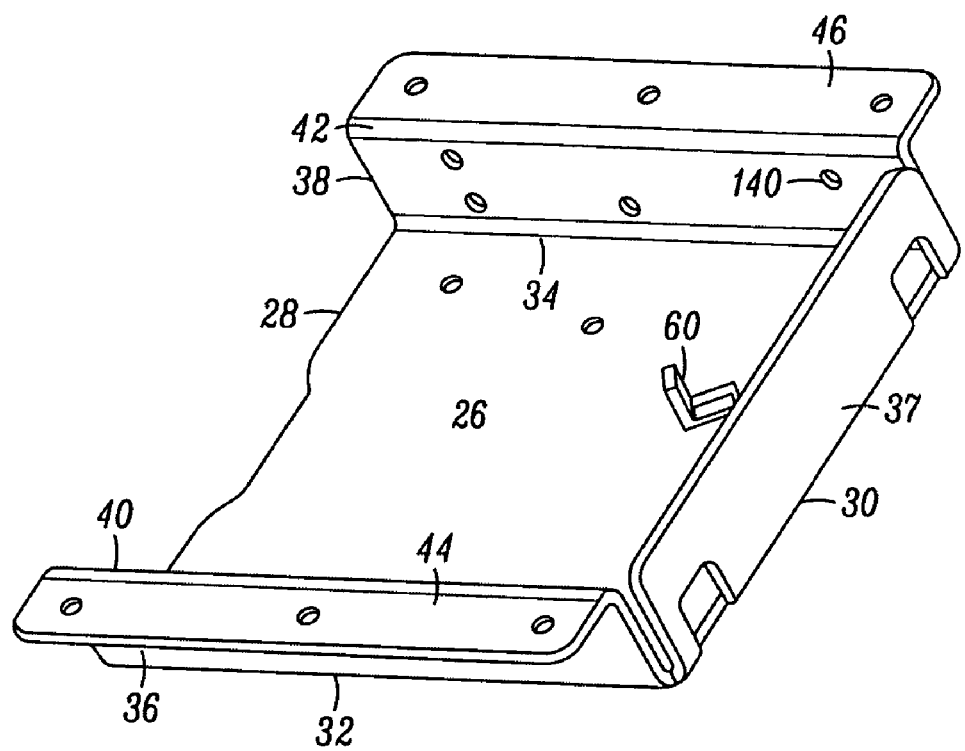
FIG. 4B is a perspective view of a frame useful in the practice of the present invention.
Figure 5:
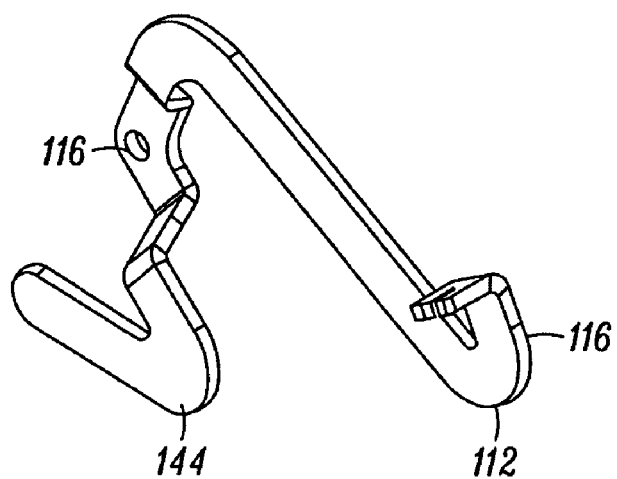
FIG. 5 is a perspective view of a lever useful in the practice of the present invention.

FIG. 4 illustrates and exploded view of the pullout step 14 and FIG. 4B shows a perspective view of the frame 18. The frame 18 has a base plate 26. The base plate 26 has a forward edge 28, a back edge 30, a pair of spaced apart side edges 32 and 34. The base plate 26 is substantially planar. A pair of spaced apart side walls 36 and 38 are connected to and upstanding from the side edges 32 and 34 of the base plate 26, respectively. Each of the side walls 36 and 38 have a top edge 40 and 42, respectively, and there is provided a flange member 44 and 46 connected to the top edges 40 and 42 of the side walls 36 and 38, respectively. The flange members 44 and 46 extend outwardly from side walls 36 and 38, respectively, in a direction away from the base plate 26. The flange members 44 and 46 are substantially coplanar and in a plane substantially parallel to the plane of the base plate 26. If desired for rigidity or any other use as may be useful in various embodiments of the present invention, a back wall 37 may extend upwardly from the back edge 30. A spring stop 60 may be provided mounted on the base plate 26 for purposes as described below in greater detail A pair of guides 48 and 50 are mounted on the base plate 26 and the guide 48 is in regions adjacent the side edge 32 and the guide 50 is in regions adjacent the side edge 34 of the base plate 26. The guides 48 and 50 are substantially parallel to each other and to the side walls 36 and 38. The guides 48 and 50 and extend from regions adjacent the front edge 28 to regions adjacent the back edge 30 of the base plate 26. FIG. 4A shows a cross section of the guide rail 50. As shown thereon, the guide rail 50 is substantially "U" shaped and has a screw aperture 53 in the base 50' to provide for attaching the guide 50 to the base plate 26. Side wall 50" of guide 50 has first walls 55 therein defining a guide aperture 57 there-through. If desired for some applications, a pin aperture 621 may be provided in side 50'. The guide 48 need not be provided with an aperture therethrough such as aperture 57 in guide rail 50 or the pin aperture 61. As installed on the base plate 26, the outer surface 50'''a of wall 50' is adjacent the side wall 38 of the frame 26. The wall 50" has an inner surface 50"a.

A pair of rails 52 and 54 are mounted for reciprocal movement in the directions of the double ended arrow 29 from a retracted condition as shown in FIG. 2 to a step position as shown in FIG. 3. The rails 52 and 54 are adjacent the guides 48 and 50, respectively, and in the preferred embodiment 10 of the present invention the rail 52 is mounted in the "U" shaped guide 48 and the rail 54 is mounted in the "U" shaped guide 50.

Figure 9:
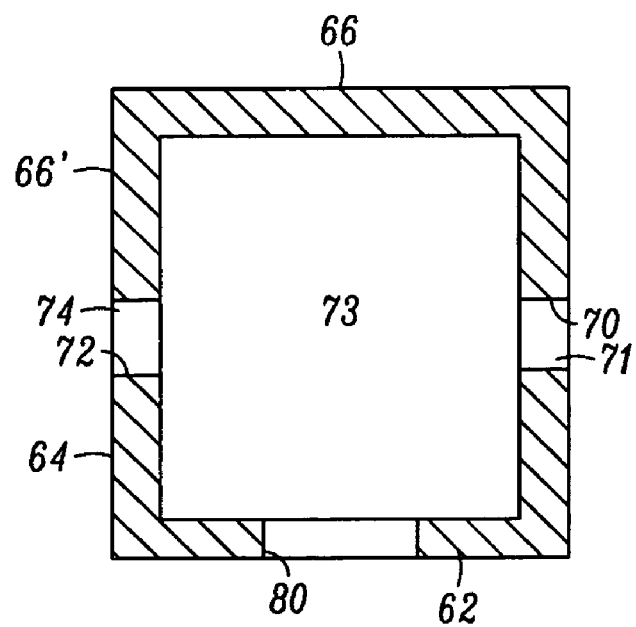
FIG. 9 is a sectional view along the line 9-9 of FIG. 8.
Figure 8:
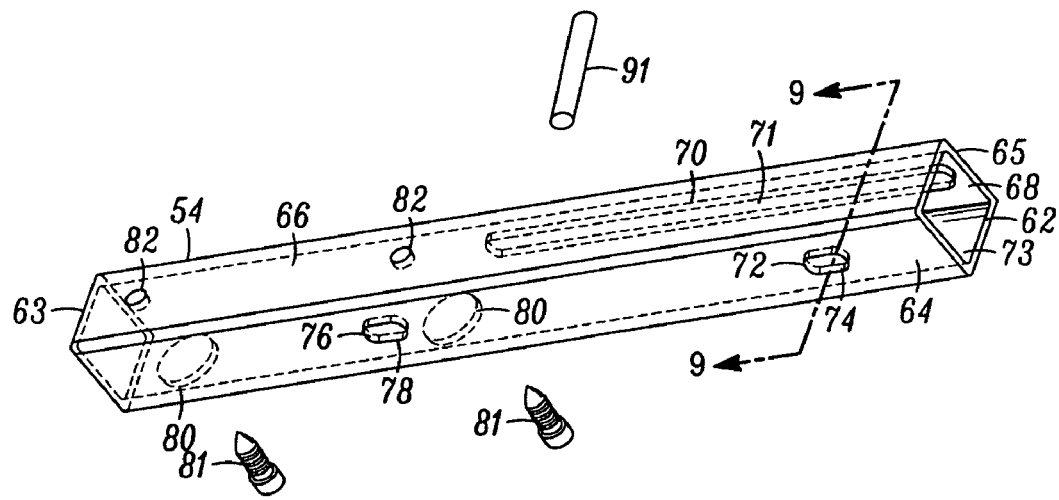
FIG. 8 is a perspective view of a rail useful in the practice of the present invention.

FIG. 8 is a perspective view of the rail 54 and FIG. 9 is a sectional view along the line 9-9 of FIG. 8. The rail 54 is a box section having a bottom wall 62 that is adjacent the inner surface 50'a of bottom wall 50' of guide 50. The rail 54 has an outer end 63 and an inner end 65. The rail 54 has a side wall 64 that is adjacent the inner surface 50"a of the guide 50.

The rail 54 has a bottom wall 62, a pair of side walls 64 and 68 and a top wall 66. AS installed in the guide 50, the side wall 64 is adjacent the inner surface 50" a of the wall 50" of the guide 50. The wall 64 has second walls 72 and 76 defining spaced apart rail apertures 74 and 78 extending through the wall 64. For the pullout step 14 in the retracted position of FIG. 2, the second rail aperture 78 is aligned with the guide aperture 57 in the guide 50. For the pullout step 14 in the step position as shown in FIG. 3, the first rail aperture 74 is aligned with the guide aperture 57. Screw holes 82 are provided in the top wall 66 through which screws 81 are inserted to retain the tread 20 on the rail 54. Apertures 80 are provided in the bottom wall 62 to allow access to screws 81 during installation on or removal of the tread 20.

In some applications it may be desired to provide slot walls 70 defining a slot 71 extending through the wall 65 of the rail 54. The slot 71 is aligned with the pin aperture 61 in the guide 50 and a pin 91 may extend through the side wall 34 of the frame 18, through the pin aperture 61 of the guide 50, through the slot aperture 71 and into the interior 73 of the rail 54. The pin 91 tends to help maintain the alignment of the rail 54 in the guide 50.

The rail 52 is generally similar to the rail 54 and is also box shaped. However, it has been found that the rail 54 need not necessarily be provided with the apertures such as the rail apertures 74 and 78 or the slot aperture 71 provided in rail 54.

Figure 11B:
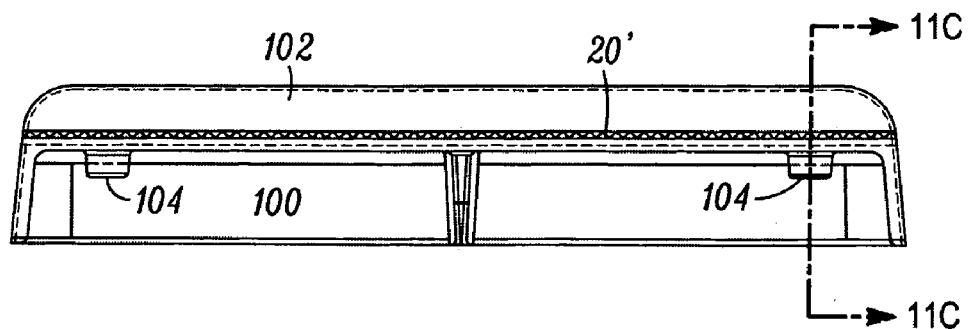
Figure 11A:
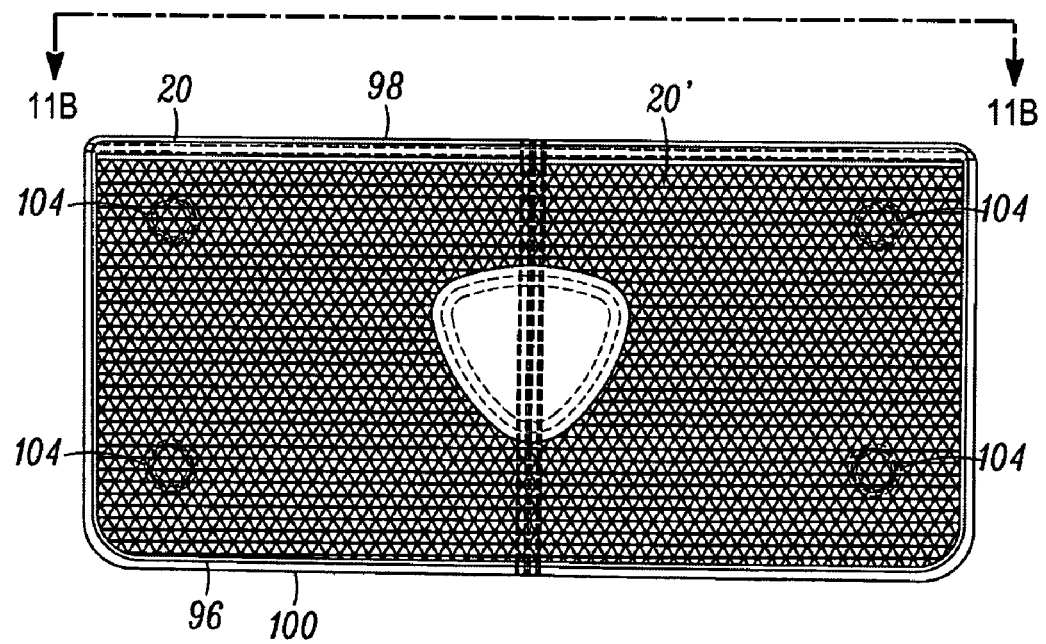
FIG. 11A is plan view of a tread useful in the practice of the present invention.
Figure 11C:
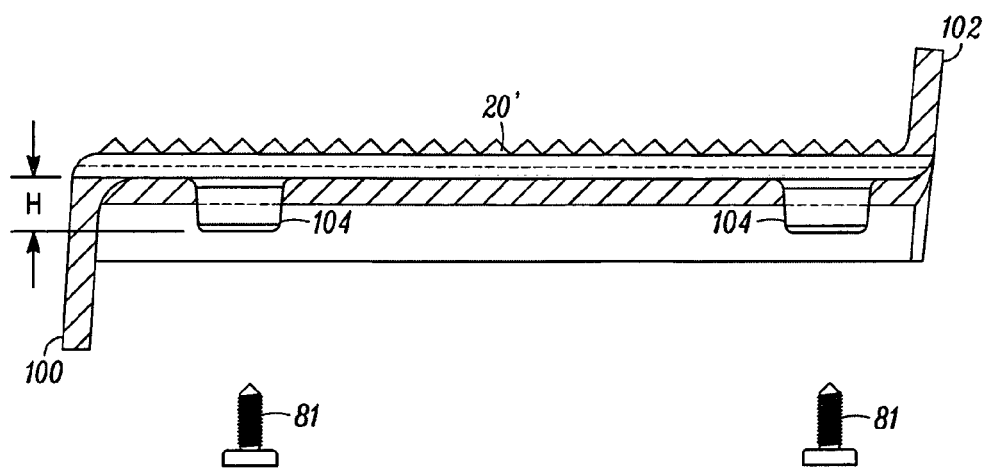
FIG. 11C is a sectional view along the line 11C-11C of FIG. 11B.

FIGS. 11A, 11B and 11C illustrate the tread 20 of the pullout step 14. As shown thereon, the tread 20 has an outer edge 96 and an inner edge 98. A lip portion 100 is connected to the outer edge 96 and extends downwardly therefrom. The lip portion 100 is manually graspable and may be utilized to move the tread 20 between the retracted position of the pullout 14 as shown on FIG. 2 and the step position as shown on FIG. 3. A toe stop may be connected to the inner edge 98 to prevent slipping of a person's shoes from the upper surface 20' of the tread 20 when in use. the upper surface 20' of the tread 20 may be textured as shown in conventional patterns for added stability during use.

The pull out step 14 is provided with a latching mechanism 110. The latching mechanism 110 is shown in FIG. 6. As shown therein there is provided a lever 112, illustrated in perspective in FIG. 9, that is pivotally mounted on the base plate 26. The lever 112 has a pivot mounting aperture 116 for mounting on a pivot pin 114 extending from the base plate 26. The first arm 118 of the lever 112 has a latching member 120 comprising the outer portion if the first arm 118. In FIG. 6 the latching member 120 is in the first engaged position thereof and projects through the aperture 55 in guide 50 and into the first aperture 71 in rail 54. In this first engaged position of the latch member 120, the rail, and consequently the tread 20, which is attached to the rail 54, is prevented from moving in either direction indicated by the arrow 122' and 122". In the first engaged position of the latch member 120 projecting into the aperture 71, as shown on FIG. 6, the tread 20 is in the step position thereof.

The second arm 124 of the lever 112 extends from the pivot pin 114 on the opposite side of the pivot pin 114 and terminates in a cable feed through 126. A flexible cable 128 extends through the cable feed through 126 and a retaining block 130 is fixed to the flexible cable 128 and abuts against the cable feed through 126 to restrain the cable against the cable feed through 126. A coil spring 132 is mounted around the cable 128 between the cable feed through and the spring stop 60 and is retrained therein. The coil spring 132 exerts a force on the cable feed through 126 in the direction of the arrow 134 to urge the latch member 120 into the first engaged position shown in FIG. 6 and yieldingly resists movement of the cable 128 in the direction of the arrow 136 which moves the latching member out of the engaged position. The cable extends through an aperture 140 in side wall 38 of frame 28 and terminates in a knob handle150 to which it is fixedly attached. A grommet 142 may be inserted in the aperture 140.

Figure 10:
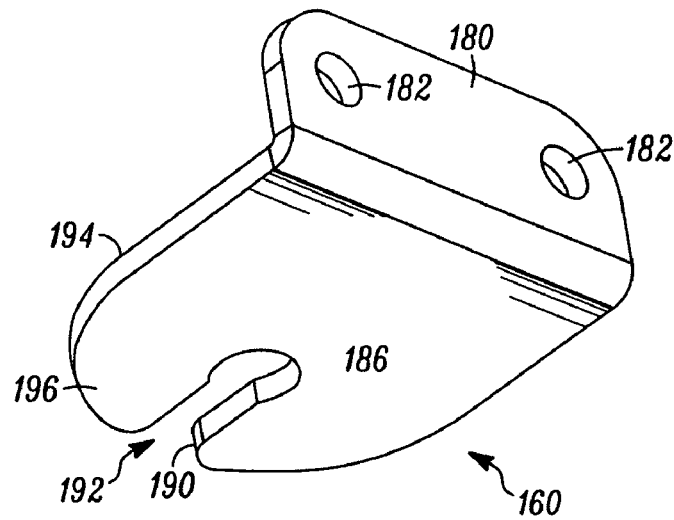
FIG. 10 is a perspective view of a cable guide useful in the practice of the present invention.

The cable 128 is provided with a flexible cable cover 152 is provided around the cable 128 from the cable stop 60 to which the flexible cable cover is attached by coupling 154 to a remote end 152' which is attached to a rigid cable cover section156. A cable guide 160, shown in detail in the perspective view of FIG. 10, is mounted on the side wall 38 and the rigid cable guide 156 is connected to a threaded feed through 162. The threaded feed through 162 is fixed to the cable guide by nuts 164 and 166 so that the flexible cable cover 152 and rigid cable cover 156 are restrained between the coupling 154 and the cable guide 160, but the cable 128 is free to move in the flexible cable cover 152 and the rigid cable cover 156.

Figure 6A:
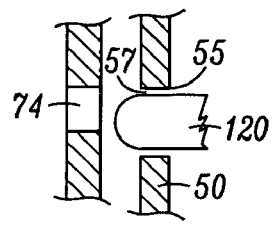
FIG. 6A is a partial sectional view that illustrates the latching mechanism of the preferred embodiment of the invention shown in FIG. 4 in the engaged position thereof.
Figure 7:
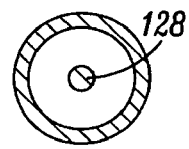
FIG. 7 is a sectional view along the line 7-7 of FIG. 6.
Figure 6:
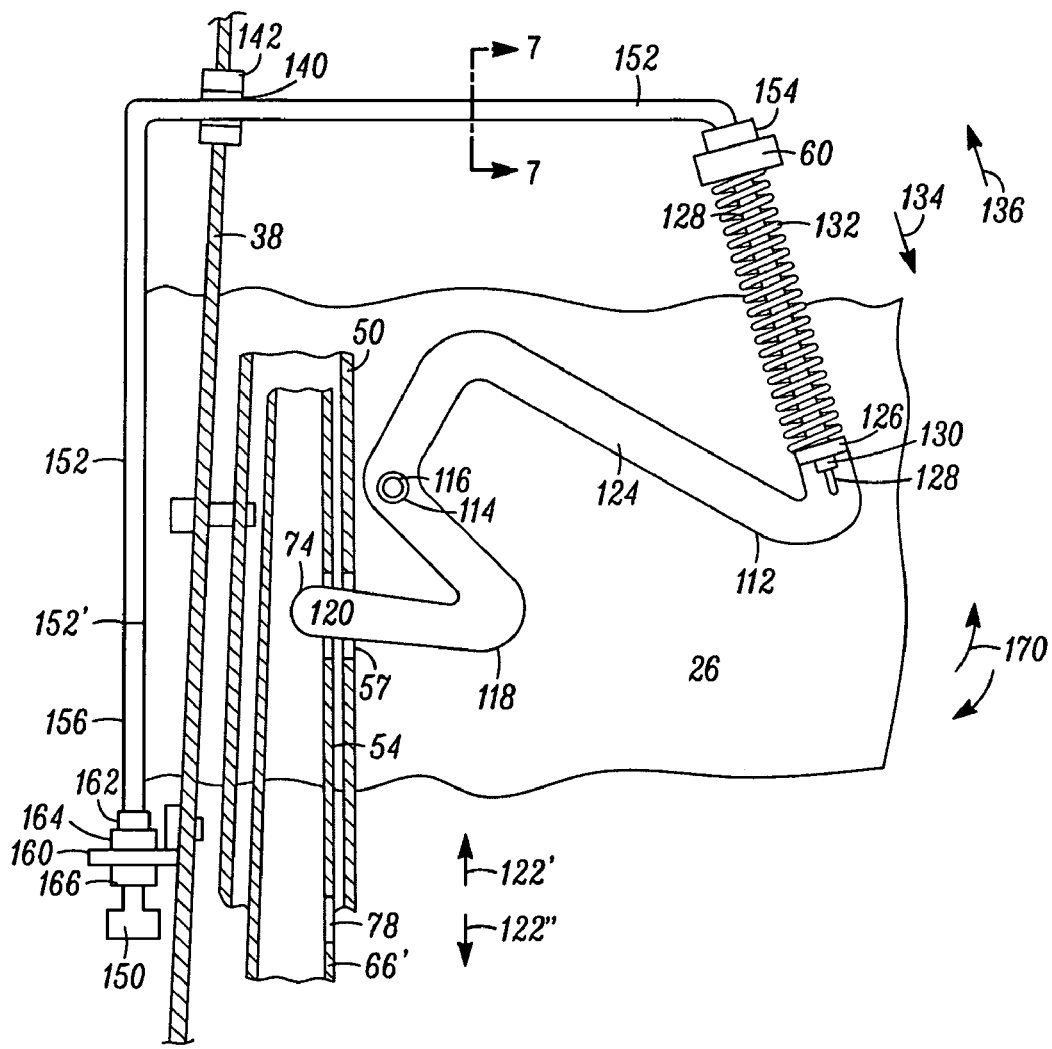
FIG. 6B is fragmentary partial sectional that illustrates the latching mechanism of the preferred embodiment of the invention shown in FIG. 4 in the retracted position thereof.

In operation, pulling on the knob handle 150 in the direction of the arrow 122" pulls the cable feed through 126 in the direction of the arrow 136 to cause pivotal rotation of the lever 112 in the direction of the arrow 170 to thereby move the latching member 120 free of the aperture 74 to the position shown in FIG. 6A With the latching member in the position shown in FIG. 6A, the tread 20 may be moved in the directions of the arrows 136 and 134 by grasping the front lip 100 of the tread 20 or other wise applying a force on the tread 20 until the desired aperture 74 or 78 is aligned with the aperture 55. The knob handle 150 may be released and the spring 132 forces the latching member 120 into the position shown in FIG. 6 and projecting into either the aperture 74 or 76. Alternatively, with the latching member 120 in the position shown in FIG. 6A, the knob handle 150 may be released and the latching member slides along the wall 66' of the rail 66 until the desired aperture 74 or 78 is properly aligned with the aperture 57.

FIG. 10 illustrates the cable guide 160 in perspective view. The cable guide 160 has a mounting portion 180 that is attached to the side wall 38 of the frame 30 by bolts extending through the bolt holes 182. The cable guide 160 has a support portion 186. The upright portion 186 has walls 190 defining an aperture 192. The threaded feed through 162 described above in connection with FIG. 6 is positionable in the aperture 192 and the nuts 164 and 166 bear against the walls 194 and 196, respectively, of the upright portion 186.

Although specific embodiments of the present invention have been described above with reference to the various Figures of the drawing, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

What is claimed is:

1. A retractable, pull-out step for a vehicle, comprising, in combination:
    a frame member having:
        a base plate having a front edge, a back edge and a pair of spaced apart side edges, said base plate substantially planar in a first plane;
        a pair of spaced apart side walls upstanding from said pair of spaced apart side edges of said base plate, and each of said side walls having a bottom edge connected to said side edges of said base plate, and each of said side walls having a top edge spaced from said base plate;
    each of said side walls having a flange member extending outwardly from said top edge in directions away from said base plate, and each of said flange members lying in a second plane substantially parallel to said first plane;
    a pair of guides mounded on said base plate, a first of said pair of guides in regions adjacent a first of said side walls and the second of said pair of guides in regions adjacent the second of said pair of side walls, and said guides extending from regions adjacent said front edge of said base plate to regions adjacent said back edge of base plate said and substantially parallel to said side walls of said base plate;
    said first of said pair of guides having first walls defining a guide aperture therethrough;
    a pair of rails, each of said pair of rails having an outer end and an inner end, a first of said pair of rails mounted for reciprocal movement adjacent a first of said pair of guides for movement of said outer end towards and away from said front edge of said base plate and the second of said rails mounted for reciprocal movement with said first rail and adjacent the second of said pair of guide for reciprocal movement towards and away from said front edge of said base plate, said pair of rails moveable between a first retracted position wherein said inner ends thereof are in regions adjacent said back edge of said base plate and a second, step position wherein said outer end of said pair of rails extends beyond said front edge of said base plate to regions external said base plate;
    said first of said pair of rails having second walls defining a pair of spaced apart rail apertures therethrough;
    a tread member rigidly mounted on said pair of rails in regions adjacent said outer ends thereof for reciprocal movement therewith;
    a pivot pin on said base plate adjacent said first of said pair of guides;
    a lever pivotally mounted on said pivot pin for pivotal movement in a plane substantially parallel to said plane of said base member and said lever having a first arm extending on a first side of said pivot pin and a second arm extending on a second side of said pivot pin;
    a latch member on said first arm of said lever and said latch member adapted to fit through said first guide aperture and through a first of said pair of spaced apart rail apertures for said latch member in a first position for the condition of said rails in said first position thereof and said latch member adapted to fit through said guide aperture and through the second of said pair of rail apertures for said latch member in said first position for the condition of said rails in said second position thereof, and said latch member pivotally movable between said first position thereof and a second position wherein said latch member is free of said guide apertures and free of said rail apertures;

a flexible cable having a first end connected to said second arm of said lever and a second end spaced from said first end and said second end having a handle thereon, said handle mounted on an outer surface of said first of said side members and in regions under a first of said flanges and adjacent said first end of said base plate;

a spring stop mounted on said base plate in a spaced relationship to said first arm of said lever;

a spring means between said spring stop and said second arm of said lever for yieldingly resisting movement of said first arm of said lever out of said first position thereof.

2. The arrangement defined in claim 1 wherein:

each of said pair of guides comprises a generally "U" shaped guide member having an inner upright wall and an outer upright wall, and the base of said "U" shaped guide members fixedly connected to said base plate;

said outer upright wall of a first of said pair of generally "U" guide members in regions adjacent to and extending substantially parallel to a first of said pair of side walls and said inner wall of said first of said pair of "U" shaped guide members spaced inwardly therefrom;

each of said pair of rails comprises a generally box shaped rail member, and a first of said box shaped rail members slidingly movable in said first of said "U" shaped guide members and the second of said pair of box shaped rail members slidingly movable in the second of said "U" shaped guide members.

3. The arrangement defined in claim 2 wherein:

said first of said pair of spaced apart rail apertures in said alignment with said guide aperture for said latch member in said first position thereof and said second of said pair of spaced apart rail apertures in said alignment with said guide aperture for said latch member in said second position thereof;

said tread member has a manually graspable lip portion or allowing manual manipulation of said tread member between said retracted position thereof and said step position thereof for the condition of said latch member in said second position thereof.

4. The arrangement defined in claim 3 and further comprising:

said outer wall of said first of said "U" shaped guide members having slot walls defining a retaining slot there through extending from regions adjacent said inner end thereof to regions spaced from said outer end thereof.

5. The arrangement defined in claim 4 and further comprising:

an alignment pin extending through said first side wall and into said retaining slot.

6. The arrangement defined in claim 5 wherein:

said base plate, said pair of side walls, said flange members and said spring stop are unitarily formed from sheet metal.

7. A retractable, pull-out step for a vehicle, comprising, in combination:

a base plate;

a tread mounted on said base plate and reciprocally movable thereon between a retracted position and a step position;

a latching mechanism mounted on said base plate, said latching mechanism having:

a lever pivotally mounted on said base plate and said lever having a latch member thereon having a first position for selectively restraining said tread in each of said retracted position and said step position thereof, and said latch member movable to a second position for selectively releasing said tread from said retracted position and said step position;

wherein said lever further comprises a first arm and a second arm spaced from said first arm;

a pivot mounting on said lever intermediate said first arm and said second arm; and a pivot pin mounted on said base plate and extending through said pivot mounting on said lever to allow pivotal movement of said lever thereon;

a flexible cable having a first end operatively connected to said lever for selectively moving said latch member out of said first position to allow movement of said tread between said retracted position and said step position, and a second end, said second end spaced from said first end and said second end having a handle thereon;

a spring means operatively connected to said lever for yieldingly resisting movement of said latch member out of said first position to said second position and urging said latch member into said first position, whereby pulling on said handle moves said cable to move said latch member from said first position thereof to said second position thereof.

8. The arrangement defined in claim 7 and further comprising:

a spring stop mounted on said base plate and spaced from said second arm of said lever;

a cable stop on said second arm of said lever, and said first end of said cable connected to said cable stop for movement therewith;

said spring comprising a coil spring mounted around said cable between said spring stop and said cable stop to provide said yieldingly resisting movement of said latch member out of said first position to said second position and urging said latch member into said first position.

9. The arrangement defined in claim 8 and further comprising:

a cable cover on said cable and said cable cover extending between said spring stop and said handle of said cable.

10. The arrangement defined in claim 9 and further comprising:

a cable guide operatively connected to said base plate for restraining movement of said cable cover, whereby said cable cover is maintained in said position between said spring stop and said cable guide, and said cable moves in said cable cover.

11. The arrangement defined in claim 10 wherein:

said cable cover further comprises:

a first portion having a first end at said spring stop and a second end spaced from said cable guide;

a second portion extending between said second end of said first portion of said cable and said cable guide, said second portion fixedly connected to said cable guide.

12. The arrangement defined in claim 11 and further comprising:
said cable guide has an outer surface and an inner surface;
said second portion of said cable cover fixedly connected to said inner surface of said cable guide and said handle abutting against, said outer surface of said cable guide for the condition of said latch member in said first position thereof.

13. The arrangement defined in claim 12 wherein:
said handle is movable outwardly away from said cable guide to move said latch member from said first position thereof to said second position thereof.

14. The arrangement defined in claim 13 wherein:
said second portion of said cable cover has a threaded section extending between said inner surface of said cable guide and said outer surface of said cable guide, and further comprising:
a first stop threadingly engaging said threaded section and abutting against said inner surface of said cable guide; and,
a second stop threadingly engaging said threaded portion and abutting against said outer surface of said cable guide for restraining said second portion against said cable guide.

15. The arrangement defined in claim 14 and further comprising:
a manually graspable lip portion on said tread for moving said tread between said step position thereof and said retracted position thereof for the condition of said latch member in said second position thereof.

16. The arrangement defined in claim 15 wherein:
said tread has an outer edge and an inner edge;
said lip portion connected to said outer edge of said tread and extending downwardly therefrom; and further comprising:
a toe stop connected to said inner edge of said tread and extending upwardly therefrom.

* * * * *